(12) United States Patent
Sippl et al.

(10) Patent No.: US 11,377,113 B2
(45) Date of Patent: Jul. 5, 2022

(54) METHOD FOR OPERATING AN AT LEAST PARTIALLY AUTONOMOUS MOTOR VEHICLE AND MOTOR VEHICLE

(71) Applicant: AUDI AG, Ingolstadt (DE)

(72) Inventors: Christoph Sippl, Beratzhausen (DE); Daniel Profendiner, Ingolstadt (DE); Felix Friedmann, Eching (DE)

(73) Assignee: Audi AG, Ingolstadt (DE)

( * ) Notice: Subject to any disclaimer, the term of this patent is extended or adjusted under 35 U.S.C. 154(b) by 111 days.

(21) Appl. No.: 16/322,732

(22) PCT Filed: Aug. 14, 2017

(86) PCT No.: PCT/EP2017/070599
§ 371 (c)(1),
(2) Date: Feb. 1, 2019

(87) PCT Pub. No.: WO2018/033518
PCT Pub. Date: Feb. 22, 2018

(65) Prior Publication Data
US 2019/0337525 A1   Nov. 7, 2019

(30) Foreign Application Priority Data

Aug. 19, 2016 (DE) .................... 10 2016 215 587.3

(51) Int. Cl.
*B60W 50/00* (2006.01)
*B60W 30/12* (2020.01)
(Continued)

(52) U.S. Cl.
CPC ........ *B60W 50/0098* (2013.01); *B60W 30/12* (2013.01); *B60W 30/16* (2013.01);
(Continued)

(58) Field of Classification Search
CPC .. B60W 50/0098; B60W 30/12; B60W 30/16; B60W 2554/00; B60W 2756/10;
(Continued)

(56) References Cited

U.S. PATENT DOCUMENTS 5,729,619 A * 3/1998 Puma .................. B60K 28/063
382/115
8,384,534 B2 2/2013 James et al.
(Continued)

FOREIGN PATENT DOCUMENTS

CN 101966846 A 2/2011
CN 102610125 A 7/2012
(Continued)

OTHER PUBLICATIONS

International Search Report and Written Opinion of the International Search Authority directed to related International Patent Application No. PCT/EP2017/070599, dated Nov. 24, 2017, with attached English-language translation; 24 pages.
(Continued)

*Primary Examiner* — Jerome Grant, II
(74) *Attorney, Agent, or Firm* — Sterne, Kessler, Goldstein & Fox P.L.L.C.

(57) ABSTRACT

A method for operating a partially autonomous motor vehicle, wherein in a non-parked state of the motor vehicle, sensor data of a sensor device, which detects at least one person in the surroundings of the motor vehicle, are analyzed with respect to a behavior of the person disadvantageously impairing the further driving operation of the motor vehicle and at least one action counteracting the behavior of the person is triggered in dependence on the analysis result.

12 Claims, 2 Drawing Sheets

(51) Int. Cl.
*B60W 30/16* (2020.01)
*G06V 20/58* (2022.01)
*G06V 40/20* (2022.01)
*G06V 40/10* (2022.01)

(52) U.S. Cl.
CPC ............ *G06V 20/58* (2022.01); *G06V 40/103* (2022.01); *G06V 40/20* (2022.01); *B60W 2050/0014* (2013.01); *B60W 2420/42* (2013.01); *B60W 2420/52* (2013.01); *B60W 2554/00* (2020.02); *B60W 2756/10* (2020.02)

(58) Field of Classification Search
CPC ..... B60W 2050/0014; B60W 2420/42; B60W 2420/52; G06K 9/00335; G06K 9/00369; G06K 9/00805; G06K 9/00
USPC .......................................................... 382/104
See application file for complete search history.

(56) References Cited

U.S. PATENT DOCUMENTS

| | | | |
|---|---|---|---|
| 8,605,947 B2 | 12/2013 | Zhang et al. | |
| 9,495,874 B1* | 11/2016 | Zhu | G06K 9/00805 |
| 9,708,002 B2 | 7/2017 | Schwarzkopf et al. | |
| 9,855,826 B2 | 1/2018 | Sorokin et al. | |
| 9,955,326 B2 | 4/2018 | Avrahami et al. | |
| 10,198,619 B1 | 2/2019 | Zhu et al. | |
| 2003/0144764 A1* | 7/2003 | Yokono | G06N 3/008 |
| | | | 700/245 |
| 2006/0195231 A1 | 8/2006 | Diebold et al. | |
| 2008/0048886 A1 | 2/2008 | Brown et al. | |
| 2011/0246156 A1 | 10/2011 | Zecha et al. | |
| 2012/0188374 A1 | 7/2012 | Taner | |
| 2013/0002870 A1 | 1/2013 | Cieler et al. | |
| 2013/0090806 A1 | 4/2013 | Hahne | |
| 2014/0236414 A1 | 8/2014 | Droz et al. | |
| 2015/0120596 A1* | 4/2015 | Fadell | G06Q 10/0631 |
| | | | 705/330 |
| 2015/0249906 A1* | 9/2015 | Thomas | B60K 37/06 |
| | | | 455/418 |
| 2015/0262429 A1* | 9/2015 | Shuster | A61B 5/4863 |
| | | | 345/633 |
| 2016/0001781 A1* | 1/2016 | Fung | B60K 28/02 |
| | | | 701/36 |
| 2016/0012301 A1 | 1/2016 | Arndt et al. | |
| 2016/0068156 A1 | 3/2016 | Horii | |
| 2016/0133131 A1* | 5/2016 | Grimm | G08G 1/096725 |
| | | | 701/117 |
| 2017/0305434 A1* | 10/2017 | Ratnasingam | G06N 20/00 |
| 2017/0364072 A1* | 12/2017 | Yako | B60W 50/00 |
| 2019/0371149 A1* | 12/2019 | Kim | G08B 21/0277 |
| 2019/0377345 A1* | 12/2019 | Bachrach | B64C 39/024 |
| 2020/0079371 A1* | 3/2020 | Sakamoto | G06K 9/00362 |
| 2020/0166897 A1* | 5/2020 | Campos | G06K 9/00798 |
| 2020/0202358 A1* | 6/2020 | McClelland | G06Q 20/3829 |
| 2020/0241545 A1* | 7/2020 | Anthony | G05D 1/0214 |
| 2020/0259948 A1* | 8/2020 | Keohane | G06F 1/1684 |

FOREIGN PATENT DOCUMENTS

| | | | | |
|---|---|---|---|---|
| CN | 102712317 A | | 10/2012 | |
| CN | 103370249 A | | 10/2013 | |
| CN | 103413359 | * | 11/2013 | ............... G07C 5/00 |
| CN | 105283883 A | | 1/2016 | |
| CN | 105556581 A | | 5/2016 | |
| CN | 105564438 | * | 5/2016 | ............ B60W 40/09 |
| CN | 110210638 | * | 9/2019 | ............ G06Q 10/02 |
| CN | 111038501 | * | 4/2020 | ............ B60W 30/09 |
| DE | 102004028772 A1 | | 1/2006 | |
| DE | 102008062916 A1 | | 6/2010 | |
| DE | 102010055795 A1 | | 6/2012 | |
| DE | 102011114888 A1 | | 4/2013 | |
| DE | 102011086998 A1 | | 5/2013 | |
| DE | 102013200398 A1 | | 7/2014 | |
| DE | 102013216490 A1 | | 2/2015 | |
| DE | 102014215057 A1 | | 2/2016 | |
| DE | 102014016625 A1 | | 5/2016 | |
| DE | 102014222132 A1 | | 5/2016 | |
| DE | 102014226188 A1 | | 6/2016 | |
| JP | 2012200818 | * | 10/2012 | .............. B25J 13/08 |
| WO | WO 2014/187594 A1 | | 11/2014 | |

OTHER PUBLICATIONS

International Preliminary Report on Patentability directed to related International Patent Application No. PCT/EP2017/070599, dated Feb. 19, 2019, with attached English-language translation; 14 pages.
Chinese Application No. 201780050882.4, Office Action dated Jan. 13, 2022; 8 pages.

* cited by examiner

Control Device 6 implements behavior model

Machine Learning Algorithm can train the behavior model

METHOD FOR OPERATING AN AT LEAST PARTIALLY AUTONOMOUS MOTOR VEHICLE AND MOTOR VEHICLE

TECHNICAL FIELD

The present application relates to a method for operating an at least partially autonomous motor vehicle.

BACKGROUND

Motor vehicles, which are operated partially autonomously or fully autonomously by automated lateral and/or longitudinal guiding interventions, have been known for some time and are increasingly coming into use in everyday street traffic. These motor vehicles typically detect their surroundings by means of a sensor unit and derive therefrom, in particular on the basis of recognized obstacles, a collision-free and/or collision-avoiding trajectory, which is implemented by specifying corresponding lateral and/or longitudinal guiding interventions. In this case, judging the behavior of other road users who drive manually guided motor vehicles receives central significance in the determination of such a trajectory.

A computer device is known from US 2014/0236414 A1, for example, which receives sensor signals describing characteristics of vehicles on a road traveled by an autonomous first vehicle and is configured to identify a second vehicle, which displays an aggressive driving style, based on these characteristics. The aggressive driving style is expressed in this case in careless or improper driving actions. The computer device is furthermore configured to change a control strategy for the first vehicle based on the aggressive driving style, wherein a distance to the second vehicle is increased or a lane change is initiated.

In actual street traffic, however, in addition to aggressive driving behavior, further irregular behaviors of road users occur, which interfere with an orderly advancement of the motor vehicle.

BRIEF DESCRIPTION OF THE DRAWINGS/FIGURES

DETAILED DESCRIPTION

Figure 1:
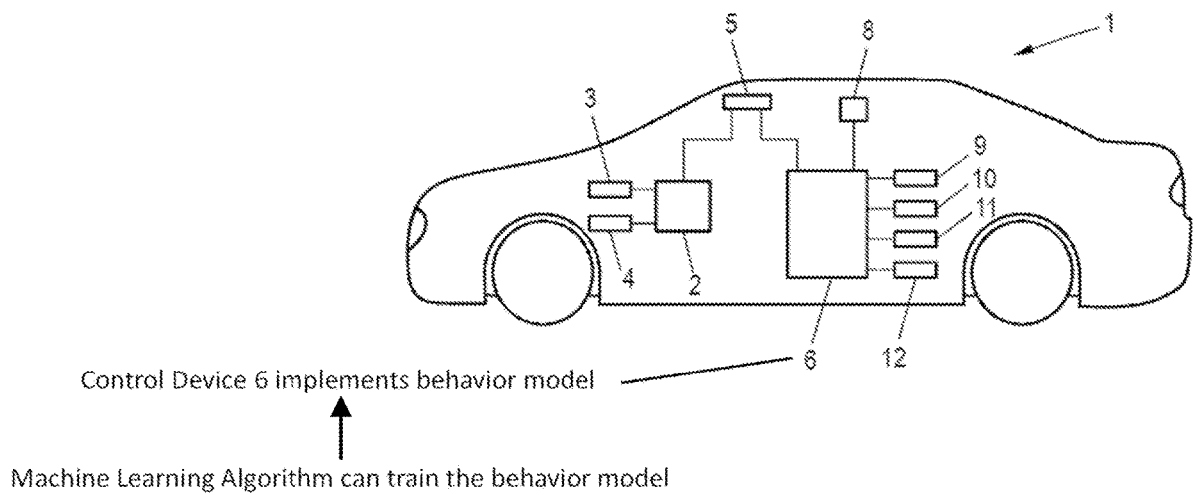
FIG. 1 shows a schematic sketch of a motor vehicle in accordance with some embodiments.

The present application is therefore based on the object of making the operation of an at least partially autonomous motor vehicle more practical with respect to irregular behaviors of other road users.

This object is achieved in accordance with some embodiments by a method for operating a partially autonomous motor vehicle, wherein, in a non-parked state of the motor vehicle, sensor data of a sensor device detecting at least one person in the surroundings of the motor vehicle are analyzed with respect to a behavior of the person disadvantageously impairing the further driving operation of the motor vehicle and at least one action counteracting the behavior of the person is triggered in dependence on the analysis result.

In accordance with some embodiments, a behavior of the persons which actively impairs the orderly advancement of the motor vehicle and in turn actively counteracting this behavior by way of the motor-vehicle-side action may be recognized. This can be the case, for example, if the person has noted that the motor vehicle is operable at least partially autonomously and therefore a collision with it is avoided by corresponding lateral and/or longitudinal guiding interventions. In particular, such a person can stop the further driving operation by actively obstructing the motor vehicle and/or "exhaust" the collision avoidance strategies of the motor vehicle by continued, interfering behaviors. This is because it has been recognized that in the case of motor vehicles which have been identified by the person as at least partially autonomous, the inhibition threshold for interfering actions is substantially lower than in the case of motor vehicles in which both the lateral and also the longitudinal guiding is specified manually by the driver. In accordance with some embodiments, in the case of such recognized behavior, an indirect and/or direct action on the person by the action to be triggered is therefore provided, in order to dissuade them from their behavior. Interference with the operation of the motor vehicle occurring in practice can thus be effectively counteracted. This applies in particular with respect to the fact that the person, for example, due to consumption of alcohol and/or drugs, behaves in a particularly uninhibited manner in street traffic. The analysis of the sensor data and the triggering of the action are expediently carried out by means of a motor-vehicle-side control unit.

In accordance with some embodiments, it is particularly advantageous if the motor vehicle is operated completely autonomously, i.e., if both the lateral and also the longitudinal guiding of the motor vehicle are carried out automatically and/or the motor vehicle is operated in a driverless manner. The latter is relevant in particular with respect to proposals for future "robot taxis" to be implemented, which do not have a driver in a manner recognizable relatively easy to the person. In this case, it is additionally conceivable that interfering persons will misuse such a motor vehicle by riding on them in an impermissible manner, in particular outside a passenger compartment of the motor vehicle.

In accordance with some embodiments, a non-parked state of the motor vehicle comprises in particular the driving of the motor vehicle, i.e., the movement at a velocity not equal to 0 km/h, and waiting at a standstill with a running engine or with an engine only stopped by a start-stop mechanism. A non-parked state is also provided in principle if a trajectory for the completely or partially autonomous further movement of the motor vehicle is planned, without the motor vehicle presently traveling along this trajectory. Electrically operated motor vehicles are also in a non-parked state if the electrical machine thereof is energized, without executing a rotational movement, to generate a magnetic field.

In accordance with some embodiments, it is preferable if the sensor device detects a pedestrian or a driver of a vehicle which is not motorized or is only slightly motorized or a rider as a person. Such a vehicle can be drivable, for example, by muscle power of a further person (for example, bicycle or electric bicycle) or by the muscle power of an animal. Such persons typically move substantially slower than the motor vehicle, so that a particular impairment potential originates from them.

In accordance with some embodiments, it may be particularly advantageous to provide a behavior model describing a behavior pattern to be understood as at least intentionally interfering is used to analyze the sensor data. The function of such behavior models is known in principle in the field of sensor-assisted surroundings registration and is conventionally used to track detected road users or predict their further movement on the basis of detected behaviors. In the scope of the analysis, a detected behavior of the person can be compared to a behavior pattern described by the behavior model.

It is particularly expedient in this case if a behavior model is used which was and/or is trained by means of a learning algorithm, which analyzes data describing exemplary behavior patterns. Therefore, algorithms of machine learning can be used for training the behavior model. The training can be carried out, for example, initially, before an initial startup of the motor vehicle, and/or progressively during the operation of the motor vehicle in street traffic. Such behavior models may be trained particularly flexibly with respect to behaviors to be understood as impairing.

In accordance with some embodiments, the method, a behavior pattern can describe an obstruction of the motor vehicle by blocking and/or excess utilization of a roadway. The person can, for example, remain directly in front of the motor vehicle without a recognizable reason, for example, when the vehicle waits in front of a traffic signal, a stop sign, or a pedestrian crossing, so that a provided driving path, in particular described by a determined trajectory of the motor vehicle, is blocked. It is also conceivable that the person, in particular as the driver of a vehicle, prevents overtaking by the motor vehicle by moving in the middle of a roadway, in particular a lane used jointly with the motor vehicle, and/or by a serpentine movement. This applies in particular with respect to bicyclists.

In accordance with yet another embodiment, a behavior pattern describes climbing onto the vehicle body of the motor vehicle. This relates in particular to the above-mentioned case of impermissible riding along (so-called "car surfing"). In this case, the person can step onto the vehicle body, for example, the outer skin, in an undesired manner and stand or lie on the motor vehicle. If the motor vehicle moves in a driverless manner, for example, the inhibition threshold of displaying such behavior is particularly low for a malicious person and/or a person under the influence of alcohol and/or drugs. This applies all the more if the motor vehicle is in a region which is observed little or not at all by other persons, for example, in a parking garage. The person can be dissuaded by the action to be triggered from "playing" with the motor vehicle in a sometimes self-endangering manner.

In accordance with some embodiments, the method, a signal horn and/or a loudspeaker of the motor vehicle can output an acoustic signal. The motor vehicle can draw attention to the fact, for example, by honking and/or playing back a signal noise and/or a signal text, that it has recognized the impairing behavior and this behavior will not be tolerated. Similarly thereto, alternatively or additionally, a lighting device of the motor vehicle can output a visual signal as the action. For this purpose, for example, external lights, in particular turn signals or a hazard light system and/or headlights can be controlled to light up.

In accordance with some embodiments, a wireless communication device of the motor vehicle transmits a message describing the presence of the impairing behavior as the action. Law enforcement forces can be summoned by this message, for example, who dissuade the person from their behavior. The message can also comprise an image of the person recorded by means of a motor-vehicle-side camera, in particular a camera of the sensor device, so that a legal prosecution of the person is facilitated. This is particularly advantageous if damage results on the motor vehicle due to the impairing behavior, i.e., in addition vandalism is carried out.

In accordance with some embodiments, when sending the message, the receiver and/or the content of the message is determined in dependence on an item of location information describing the location at which the motor vehicle is located. It is therefore conceivable that the message comprises position data with respect to the motor vehicle. Furthermore, in public street traffic, for example, the police can be selected as the receiver, while in contrast if the motor vehicle is presently located in a parking garage or the like, a parking attendant or a corresponding security service is selected as the receiver. The location information is determined, for example, by means of a position sensor, in particular on the basis of a global satellite navigation system. The motor vehicle can retrieve suitable receivers of the message, for example, by means of the communication device from a server, in particular via the Internet, or from a motor-vehicle-internal memory.

However, the use of the location information is not restricted to the sending of the message. Thus, in accordance with some embodiments, the method for a reaction adequate to the situation to the impairing behavior may be provided that the triggering action is selected from multiple applicable actions in dependence on the location information. Such applicable actions can be, for example, the above-mentioned output of the acoustic signal and/or the visual signal and/or the sending of the message. Thus, in public street traffic, for example, at an intersection or in a pedestrian zone, different actions can be triggered than in a parking garage. At least one acoustic signal and/or one optical signal is preferably output as the action in public street traffic. In a parking garage, it is particularly expedient if at least one message is sent.

In accordance with some embodiments, a motor vehicle, comprising a sensor device for detecting its surroundings is disclosed. The motor vehicle is operable according to the method disclosed herein. All embodiments of the method may be transferred similarly to the motor vehicle so that the above-mentioned advantages can also be achieved using this motor vehicle. Further advantages result from the exemplary embodiments described hereafter and on the basis of the drawings.

FIG. 1 shows a schematic sketch of a motor vehicle in accordance with some embodiments. A motor vehicle 1, comprising a vehicle system 2, by which a drive device 3 and a steering device 4 for completely autonomous driving operation of the motor vehicle 1 are controllable. In accordance with some embodiments, the vehicle system 2 is only designed for partially autonomous operation of the motor vehicle 1, i.e., it controls only the drive device 3 or the steering device 4.

The vehicle system 2 receives sensor data of a sensor device 5 detecting the surroundings of the motor vehicle 1 and plans, on the basis of these sensor data, a trajectory for a future driving path of the motor vehicle 1. The sensor device 5 is represented in the present case by a camera detecting the area in front of the motor vehicle 1. The sensor device 5 can also have further sensors detecting the entire surroundings of the motor vehicle 1, for example, radar and/or lidar and/or ultrasound sensors and/or at least one further camera.

The motor vehicle 1 furthermore has a control device 6, which also receives the sensor data of the sensor device 5. The control device 6 analyzes the sensor units with respect to a behavior disadvantageously impairing the further driving operation of the motor vehicle 1 of a person 7 detected in its surroundings by means of the sensor device 5 (cf. FIGS. 2 and 3). For this purpose, a behavior model is implemented by the control device 6, which describes multiple behavior patterns to be interpreted as intentionally interfering. The behavior model was trained before the startup of the motor vehicle 1 by means of a learning algorithm on the basis of exemplary interfering behavior patterns. The learning algorithm, which implements machine learning, is also trained in the further operation of the motor vehicle 1 on the basis of detected sensor data, which describe interfering behavior patterns of other road users, and thus progressively expands its database.

The motor vehicle 1 furthermore comprises a position sensor 8, for example, on the basis of a global navigation satellite system, which provides location information describing a location at which the motor vehicle 1 is located to the control device 6. If the control device 6 recognizes on the basis of the behavior model an intentionally interfering behavior pattern of the person 1, it selects in dependence on the location information at least one action counteracting the behavior of the person 7 from an action catalog. This comprises the output of an acoustic signal by means of a signal horn 9 and a loudspeaker 10 addressing the surroundings of the motor vehicle 1, the output of a visual signal by means of an illumination device 11, and the transmission of a message describing the presence of the impairing behavior by means of a wireless communication device 12. The control device 6 controls the signal horn 9, the loudspeaker 10, the illumination device 11, and the communication device 12 accordingly, wherein the receiver and the contents of the message transmitted via the communication device 12 are also determined in dependence on the location information.

Figure 2:
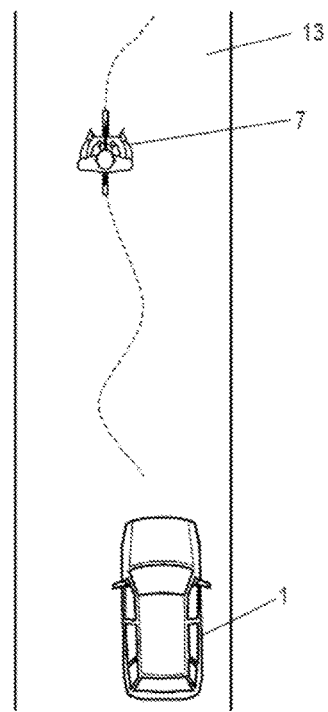
FIG. 2 shows an exemplary traffic situation in accordance with some embodiments.

FIG. 2 shows an exemplary traffic situation in accordance with some embodiments. Shown in FIG. 2 is a person 7 obstructing the motor vehicle 1. In the present case, the person 7 is a bicyclist, but can similarly also be a pedestrian, a rider, or a driver of another vehicle which is motorized only slightly or not at all, such as a scooter or a carriage. The person 7 excessively occupies a roadway 13, on which both the motor vehicle 1 and also the person 7 are located, by serpentine travel in such a way that the motor vehicle 1 cannot determine a collision-free trajectory for overtaking the person 7 and is therefore obstructed in its advancement. Such malicious behavior of the person 7 can be expected, for example, if this person has recognized that the motor vehicle 1 is operable at least partially autonomously and is therefore configured for substantial collision avoidance. In particular if a driver is not located in the motor vehicle 1, the inhibition threshold of the person 7 for obstructing the motor vehicle 1 is substantially reduced.

To counteract such a behavior, the sensor device 5 detects the person 7, after which the sensor data are analyzed by the control device 6. Such serpentine travel is described therein by the behavior model as a behavior pattern to be interpreted as intentionally interfering. The control device 6 then selects multiple actions counteracting the behavior of the person 7 in consideration of the location information, which describes that the motor vehicle is presently located on a public road, and controls the corresponding devices of the motor vehicle to carry out these actions. In the present case, firstly a honking tone is output via the signal horn 9 and subsequently a notification text is output by means of the loudspeaker 10, which request that the person 7 cease the interference. In parallel thereto, the illumination device 11 is controlled to output a visual signal. In this case, for example, a turn signal and/or a hazard light system of the motor vehicle 1 is controlled and multiple short flashing light signals of high beams are triggered. In particular if the interfering behavior of the person 7 is not dissuaded after some time, a message which has a notification of the impairing behavior as the content is transmitted by means of the communication devices 12 to a locally responsible police station, for example, by SMS via a mobile wireless network.

These actions are also executed in comparable situations, in which the person 7 moves without any reason in the middle of the roadway 13 in such a way that overtaking is not possible or the person blocks starting of the motor vehicle 1 from a standstill, for example, at a traffic light, an intersection, or a pedestrian crossing.

Figure 3:
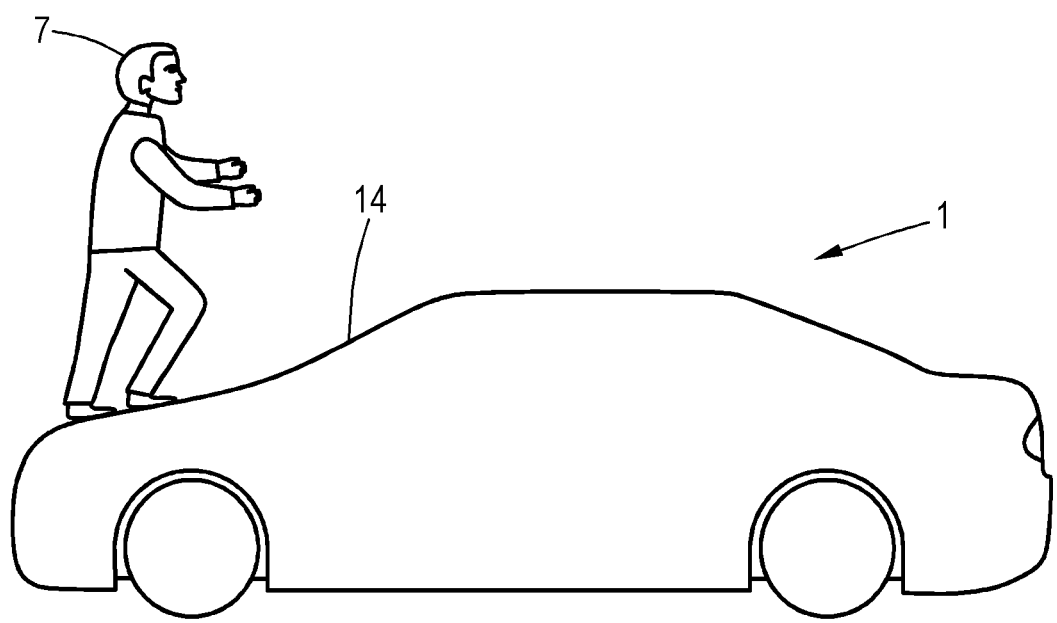
FIG. 3 shows a further exemplary traffic situation in accordance with some embodiments.

FIG. 3 shows a further exemplary traffic situation in accordance with some embodiments. As shown in FIG. 3, a person 7 has climbed onto a vehicle body 14 of the driving motor vehicle 1. Such a behavior is conceivable, for example, if the motor vehicle 1 is driverless, for example, a driverless taxi during an empty trip, and the person 7 is substantially uninhibited, for example, as a result of consumption of alcohol and/or drugs or intends to commit vandalism.

Such behavior is also described as a behavior pattern by the behavior model, so that corresponding actions for protection from self-endangerment of the person 7 and for protection of the motor vehicle 1 from damage are executed. In addition to the above-described control of the signal horn 9, the loudspeaker 10, and the illumination device 11, which output particularly urgent signals in this case, in addition an image of the person 7 is recorded using the camera of the sensor device 5 in this case and appended to the message to facilitate legal prosecution of the person 7. The message, if the behavior takes place in public street traffic, is transmitted to the police in dependence on the location information. In contrast, if the motor vehicle 1 is located in a parking garage, to be automatically parked therein, the message is transmitted to a local security service of the parking garage, so that attendant personnel can quickly suppress the behavior of the person 7. Corresponding destination addresses for the message are stored in the control device 6, for example, or can be retrieved by it with the aid of the communication devices 11, for example, from the Internet.

The invention claimed is:
1. A method, comprising:
   detecting, at a sensor device, sensor data comprising an obstructive behavior of a person external to a motor vehicle;
   training a behavior model, before an initial startup of the motor vehicle and while operating the motor vehicle in street traffic, using a machine learning algorithm to analyze at least one behavior pattern of a plurality of behavior patterns of the behavior model, wherein the at least one behavior pattern is identified as impairing of a driving operation of the motor vehicle, the machine learning algorithm progressively expanding a database of the plurality of behavior patterns of other road users based on the detected sensor data;
   analyzing, using the behavior model, the sensor data to determine a characteristic of the obstructive behavior that matches with the at least one behavior pattern; and
   in response to the characteristic of the obstructive behavior identified as impairing of the driving operation of the motor vehicle, triggering at least one action to counteract the impairing of the driving operation of the motor vehicle, wherein the motor vehicle is a partially autonomous motor vehicle in a non-parked state, and wherein the at least one behavior pattern comprises intentionally interfering with the driving operation of the motor vehicle by the person external to the motor vehicle by blocking of a roadway or an excess utilization of the roadway.

2. The method of claim 1, wherein the person external to the motor vehicle is a pedestrian, a driver, or a rider.

3. The method of claim 1, wherein the at least one behavior pattern is a climbing onto a body of the motor vehicle.

4. The method of claim 1, wherein the triggering at least one action to counteract the impairing of the driving operation comprises blowing a signal horn of the motor vehicle, sending an audio signal, displaying a visual signal, or sending a message comprising a description of the behavior impairing the driving operation.

5. The method of claim 4, further comprising determining a receiver and a content of the message based on a location of the motor vehicle.

6. The method of claim 1, wherein the triggering at least one action to counteract the impairing of the driving operation includes triggering based on a location of the motor vehicle.

7. A motor vehicle, comprising:
at least one sensor; and
a control device configured to:
detect, at the at least one sensor, sensor data comprising an obstructive behavior of a person external to the motor vehicle;
train a behavior model, before an initial startup of the motor vehicle and while operating the motor vehicle in street traffic, using a machine learning algorithm to analyze at least one behavior pattern of a plurality of behavior patterns of the behavior model, wherein the at least one behavior pattern is identified as impairing of a driving operation of the motor vehicle, the machine learning algorithm progressively expanding a database of the plurality of behavior patterns of other road users based on the detected sensor data;

analyze, using the behavior model, the sensor data to determine a characteristic of the obstructive behavior that matches with the at least one behavior pattern; and in response to the characteristic of the obstructive behavior identified as impairing of the driving operation of the motor vehicle, trigger at least one action to counteract the impairing of the driving operation of the motor vehicle, wherein the motor vehicle is a partially autonomous motor vehicle in a non-parked state, and wherein the at least one behavior pattern comprises intentionally interfering with the driving operation of the motor vehicle by the person external to the motor vehicle by blocking of a roadway or an excess utilization of the roadway.

8. The motor vehicle of claim 7, wherein the person external to the motor vehicle is a pedestrian, a driver, or a rider.

9. The motor vehicle of claim 7, wherein the at least one behavior pattern is climbing onto a body of the motor vehicle.

10. The motor vehicle of claim 7, wherein the control device is further configured to trigger the at least one action to counteract the impairing of the driving operation by being configured to blow a signal horn of the motor vehicle, send an audio signal, display a visual signal, or send a message comprising a description of the behavior impairing the driving operation.

11. The motor vehicle of claim 10, wherein the control device is further configured to determine a receiver and a content of the message based on a location of the motor vehicle.

12. The motor vehicle of claim 7, wherein the control device is further configured to trigger the at least one action based on a location of the motor vehicle.

* * * * *